United States Patent
Blanc et al.

(10) Patent No.: US 8,935,845 B2
(45) Date of Patent: Jan. 20, 2015

(54) METHOD FOR MANUFACTURING AN INNER ROTOR FOR A ROTARY ELECTRIC MACHINE

(75) Inventors: Maeick Blanc, Chatonnaye (CH); Bertrand Vedy, La Tour de Peilz (CH)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 227 days.

(21) Appl. No.: 13/386,613

(22) PCT Filed: Jul. 21, 2010

(86) PCT No.: PCT/EP2010/060567
§ 371 (c)(1),
(2), (4) Date: May 2, 2012

(87) PCT Pub. No.: WO2011/009886
PCT Pub. Date: Jan. 27, 2011

(65) Prior Publication Data
US 2012/0206008 A1    Aug. 16, 2012

(30) Foreign Application Priority Data

Jul. 22, 2009  (FR) ...................................... 09 55118

(51) Int. Cl.
*H02K 15/02* (2006.01)
*H02K 15/10* (2006.01)
*H02K 1/27* (2006.01)
*H02K 15/03* (2006.01)

(52) U.S. Cl.
CPC .............. *H02K 1/2773* (2013.01); *H02K 15/03* (2013.01); *H02K 15/024* (2013.01)

USPC ................................... 29/598; 29/596; 29/609

(58) Field of Classification Search
USPC .............. 29/598, 418, 596, 609, 738; 310/43, 310/156.48, 214, 216.049
See application file for complete search history.

(56) References Cited

U.S. PATENT DOCUMENTS

| | | | |
|---|---|---|---|
| 3,823,460 A | | 7/1974 | Bergmann |
| 4,504,755 A | | 3/1985 | Semones et al. |
| 4,631,807 A | | 12/1986 | Kawada et al. |
| 5,124,607 A | * | 6/1992 | Rieber et al. .................. 310/214 |

FOREIGN PATENT DOCUMENTS

| | | |
|---|---|---|
| JP | 58 170343 | 10/1983 |
| JP | 59 083563 | 5/1984 |
| JP | 61 177146 | 8/1986 |

* cited by examiner

*Primary Examiner* — Thiem Phan
(74) *Attorney, Agent, or Firm* — Cozen O'Connor

(57) ABSTRACT

A method for manufacturing an inner rotor for a rotary electric machine, the rotor comprising a plurality of pole pieces surrounding a shaft, each pole piece being made from a stack of metal sheets (3) made of magnetic material, the pole pieces delimiting recesses between them for permanent magnets. The method comprises, in succession the steps of cutting blanks (33) each grouping together n metal sheets (3), "n" being the number of poles of the rotor, the n metal sheets of a blank being held together by temporary bridges (35) straddling the recesses, at least two bridges each comprising an outer lug (36), stacking the blanks while keeping them aligned via the outer lugs, immobilizing the stack of blanks, and eliminating all the temporary bridges in order to free up the radial access to the recesses.

10 Claims, 5 Drawing Sheets

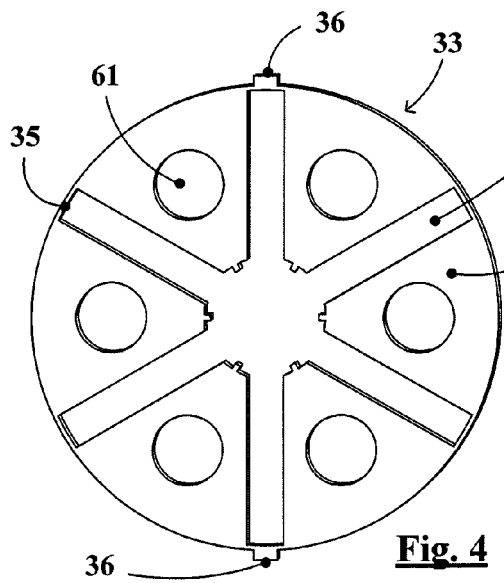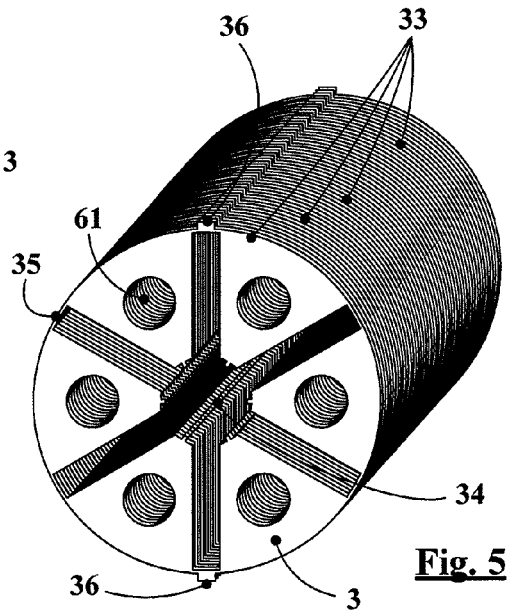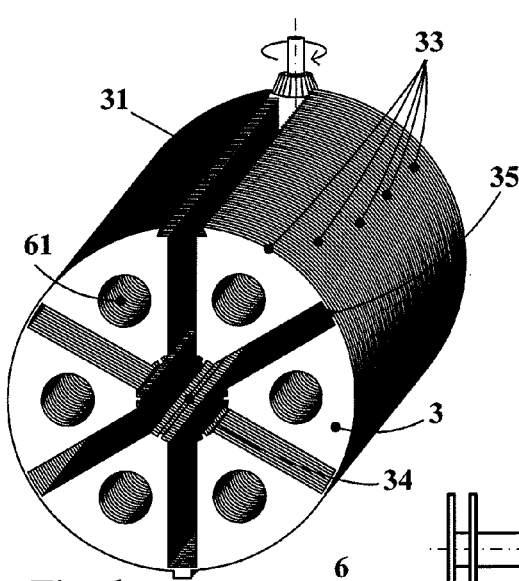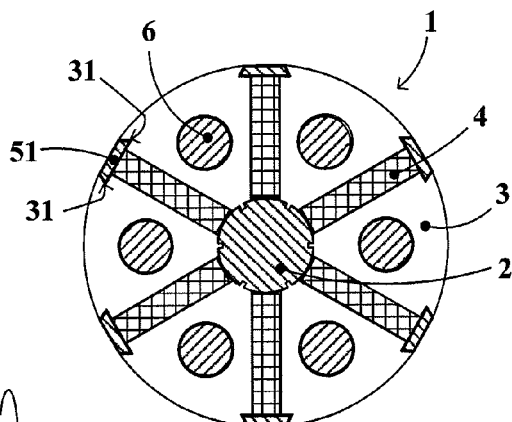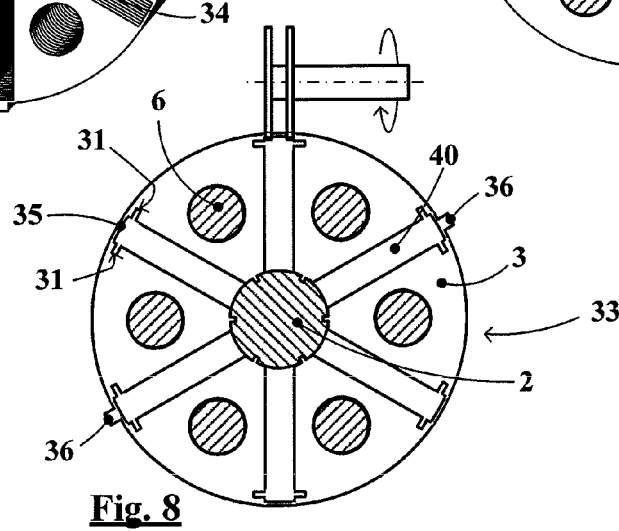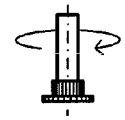

METHOD FOR MANUFACTURING AN INNER ROTOR FOR A ROTARY ELECTRIC MACHINE

RELATED APPLICATIONS

This is a U.S. National Phase Application under 35 USC §371 of International Application PCT/EP2010/060567, filed on Jul. 21, 2010.

This application claims the priority of French application Ser. No. 09/55118 filed on Jul. 22, 2009, the content of which is hereby incorporated by reference.

FIELD OF THE INVENTION

The invention relates to rotary electric machines whose inner rotor includes permanent magnets. More specifically, the invention relates to the machines in which the magnets are arranged in voids in the rotor. The electric machines concerned are commonly described as "buried magnet" machines. This rotor arrangement principle is widely applied for self-controlled synchronous machines with flux concentration.

BACKGROUND OF THE INVENTION

The dimensioning of a rotary electric machine depends on its nominal torque. The greater the torque that a motor is capable of delivering, the more bulky the electric motor, all other things being equal. There are, however, applications for which it is desirable to obtain both high powers and a great motor compactness. To give a simple physical example, when electric drive motors are to be installed in the wheels of motor vehicles, it is desirable to be able to develop powers of at least 10 kW per motor, and even mostly at least 25 or 30 kW per motor, for the lowest possible weight in order to limit as much as possible the unsuspended weights. It is also desirable for the bulk to be as small as possible, exceeding by as little as possible the internal volume of the wheel so as not to interfere with the elements of the vehicle in the movements of the suspension and in other types of movement of the wheel relative to the body shell of the vehicle.

These two imperatives (high power, low bulk and weight) make the installation of electric drive motors in the wheels of private passenger vehicles highly problematical, unless there is a radical improvement in the power/weight ratio of the electric machines currently available on the market.

The choice of a high speed for an electric motor when designing the motor is one solution that makes it possible, with a given power, to reduce the torque, and therefore the bulk. In other words, for a given nominal motor power, the greater its nominal rotation speed, the smaller its bulk.

A specific design for obtaining high rotation speeds has already been proposed in the patent application EP 1001507. The speeds targeted in this patent application are of the order of 12 000 rpm, by proposing for this a particular arrangement of the assembly consisting of a polygonal amagnetic single-piece shaft and pole pieces shrewdly positioned around this shaft. A refinement that makes it possible to target speeds of the order of 20 000 rpm has been proposed in the patent application EP 1359657, by proposing for this an arrangement using wedges to radially block the magnets in their recesses between the pole pieces.

The pole pieces consist of a stack of metal sheets, each metal sheet being cut in the form of a disc segment. The method for manufacturing these pole pieces and assembling the rotor is particularly lengthy and complex in order in particular to ensure the best alignment of the metal sheets in the stack.

SUMMARY OF THE INVENTION

One objective of the invention is to improve the method for manufacturing rotors for rotary electric machines.

This and other objects are attained in accordance with one aspect of the invention directed to a method for manufacturing an inner rotor for a rotary electric machine, the rotor comprising a plurality of pole pieces surrounding a shaft, each pole piece being made from a stack of metal sheets made of magnetic material, the pole pieces delimiting recesses between them for permanent magnets, said method comprising, in succession, the steps of:

cutting blanks, each grouping together n metal sheets, "n" being the number of poles of the rotor, the n metal sheets of a blank being held together by temporary bridges straddling the recesses, at least two bridges each including an outer lug, stacking the blanks while keeping them aligned via the outer lugs, immobilizing the stack of blanks, eliminating all the temporary bridges in order to free up the radial access to the recesses.

Preferably, the stack of blanks is immobilized between lateral flanges via tie rods, the lateral flanges and the tie rods then forming an integral part of the rotor.

Also preferably, the temporary bridges are eliminated by machining.

According to a first variant, the cutting of the blanks also has the effect of defining longitudinal grooves in the walls of the recesses in proximity to the outer edge of the pole pieces.

Preferably, the method also comprises a subsequent step consisting in inserting the magnets radially into the recesses then placing wedges in the longitudinal grooves for radially securing the magnets.

Preferably, the blanks are obtained by cutting a metal strip, in particular by stamping.

According to a first variant of the method, one blank in every two is turned over after cutting and before stacking.

According to a second variant of the method, each blank is indexed by an angle $\alpha$ relative to the preceding blank during the stacking, $\alpha$ being a multiple of $360°/n$.

Another aspect of the invention relates to a rotary electric machine comprising an inner rotor obtained by said method.

BRIEF DESCRIPTION OF THE DRAWINGS

FIG. 4 is a perspective view of a blank used in the manufacturing method according to an embodiment of the invention;

FIG. 5 is a perspective view illustrating the step of the method according to an embodiment of the invention of stacking a large number of blanks according to FIG. 4;

FIG. 6 is a perspective view illustrating the step of the method according to an embodiment of the invention of separating the stack into a number of pole pieces;

FIG. 7 is a view in cross section perpendicular to the axis of the rotor along a line C-C which can be seen in FIG. 1 but which corresponds to the exemplary production method illustrated in FIGS. 4 to 6;

FIG. 8 illustrates another exemplary production method according to the invention;

FIG. 9 schematically shows another example of a tool which can be used in the method according to an embodiment of the invention;

DETAILED DESCRIPTION OF THE DRAWINGS

Figure 1:
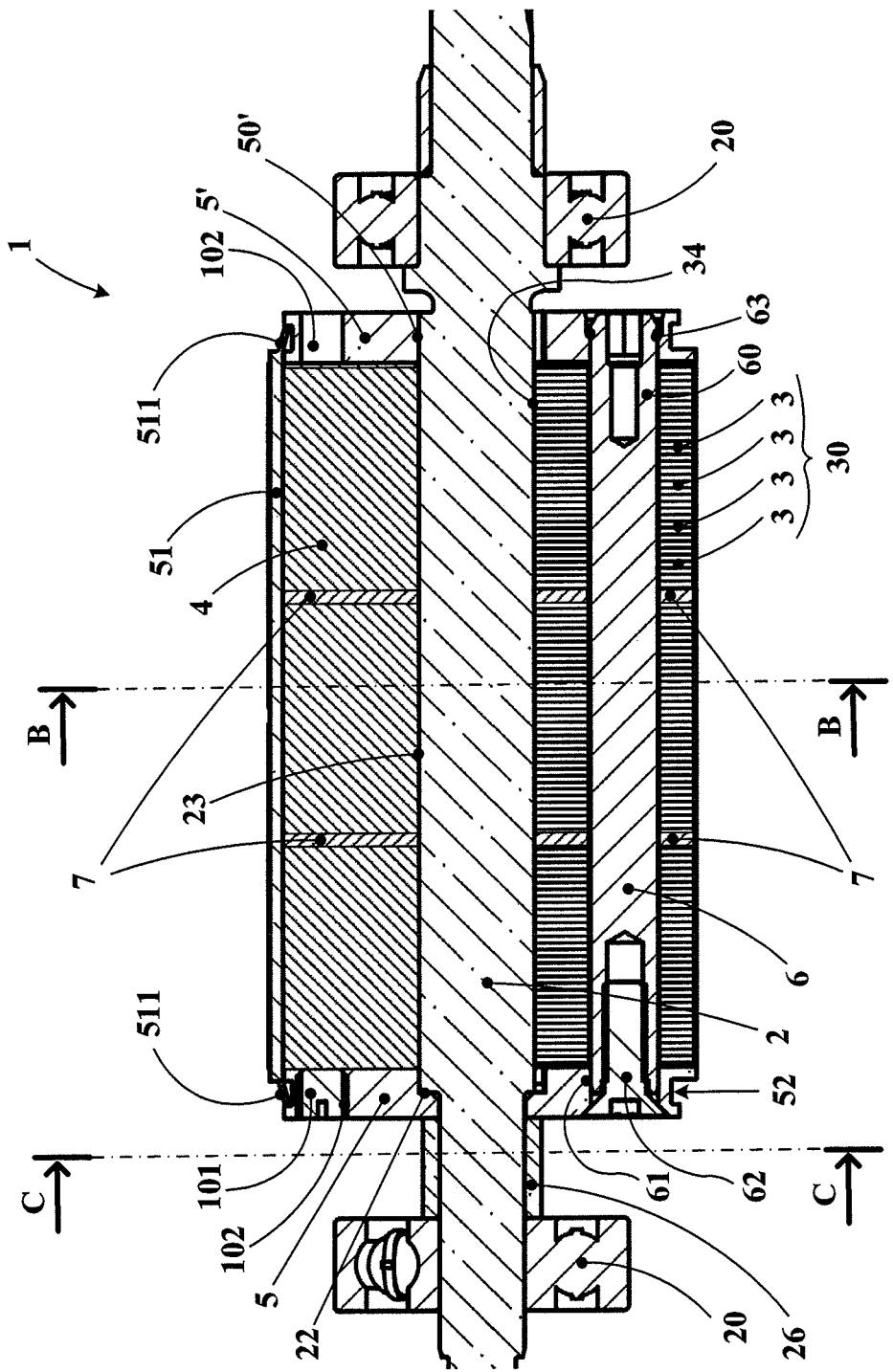
FIG. 1 is a cross-sectional view along the axis of a rotor according to an embodiment of the invention along a chain-dotted line A-A which can be seen in FIGS. 2 and 3.

FIG. 1 shows a rotor 1 for a hexa-polar machine also including a stator which is not represented. The rotor 1 comprises a shaft 2 resting on bearings 20. Six pole pieces 30 can be seen, preferably formed by a stack of ferro-magnetic metal sheets 3. Each metal sheet 3 is substantially perpendicular to the axis of the shaft. The metal sheets have a very small thickness, for example of the order of a few tenths of a millimeter, for example 0.2 mm.

Axially at either end of the shaft 2, a lateral flange 5, 5' (preferably made of amagnetic material) can be seen, situated on each side of the pole pieces 30. In FIG. 1, two optional intermediate flanges 7 (preferably also made of amagnetic material) can also be seen. Each lateral flange and, where appropriate, each intermediate flange 7, has a central opening. In the nonlimiting example described in FIG. 1, the shape of the central opening of the lateral flanges is circular whereas that of the central opening of the intermediate flanges is fitted to the grooved section of the shaft 2.

For each of the pole pieces 30, a tie rod 6 passes through the stack of metal sheets 3, where appropriate the intermediate flange(s) 7, and is used to grip everything between the lateral flanges 5 and 5'.

Parallelepipidal permanent magnets 4 can be seen, arranged in the recesses 40 between the pole pieces 30. The recesses are interrupted by the intermediate flange or flanges 7. In the example of FIG. 1, there are therefore 3 magnets for each pole. Each of the recesses of the magnets is closed by a magnet wedge 51.

Figure 2:
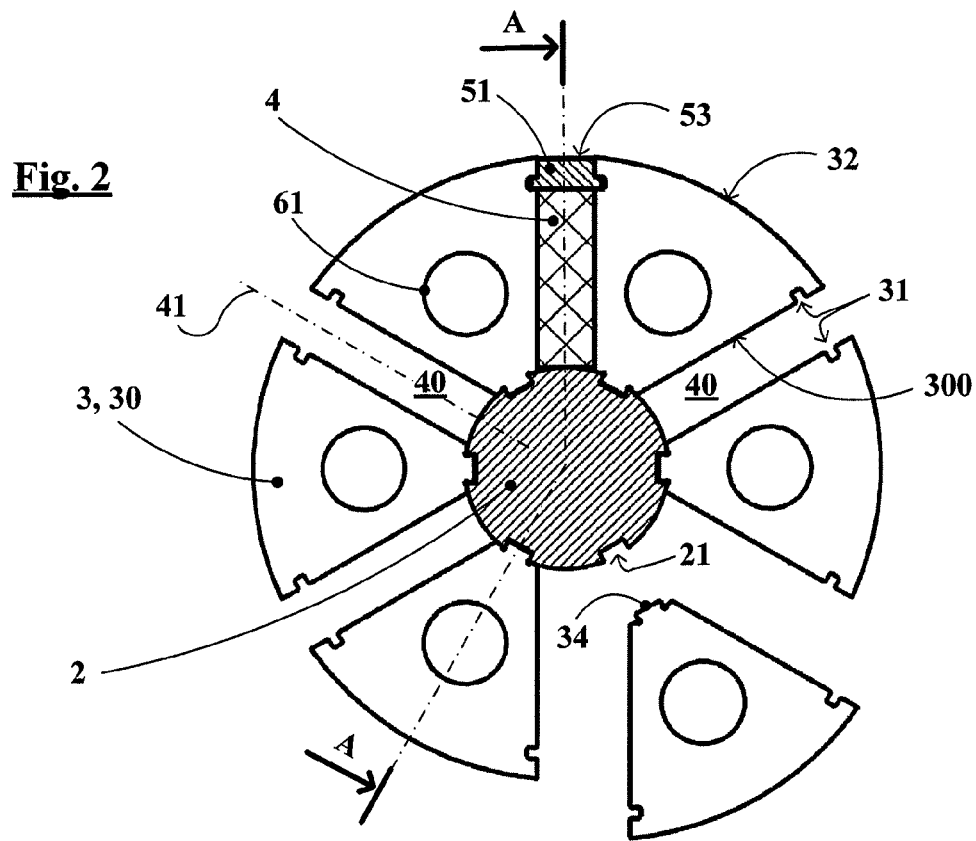
FIG. 2 is a partial view in cross section perpendicular to the axis of the rotor of FIG. 1 along a line B-B which can be seen in FIG. 1.

Moreover, as can be seen in FIG. 2, the longitudinal faces 300 of the pole pieces 30 each have a groove 31 parallel to the axis of the rotor, hollowed out at a radial level close to the outer edge 32 of each pole piece 30 (and therefore of each metal sheet 3), said pole pieces also having a height (or, more precisely, a radial dimension) slightly greater than the height of the magnets 4. Each wedge 51 thus bears on two grooves 31 arranged on each of the adjacent pole pieces. The magnets 4 are thus mechanically secured to the pole pieces 30. The essential function of each groove 31 is to form a shoulder or dovetail to oppose the centrifugation of the wedges and of the magnets. The pole pieces are attached together by virtue of the tie rods and the lateral, and possibly intermediate, flanges.

The pole pieces are themselves attached to the shaft in rotation via a rib 34 cooperating with a groove 21 in the shaft and axially immobilized by virtue of the tie rods and the lateral flanges. A bead 63 placed in a groove of one end of the tie rod stops the latter relative to one of the flanges (on the right in this figure) whereas a screw 62 is screwed at the other end of the same tie rod (on the left in the figure). Such a rotor thus supports, without damage, very high rotation speeds, very much greater than 10 000 rpm, mainly speeds of the order of at least 20 000 rpm.

FIGS. 4 to 13 illustrate essential aspects of the method according to the invention for the manufacture of such a rotor.

FIG. 4 shows a blank 33 grouping together six metal sheets 3, each metal sheet being intended to belong to one of the six pole pieces of the rotor. The six metal sheets are temporarily held together via temporary bridges 35. At least two of the bridges include outer lugs 36, the purpose of which will be described later.

The blank 33 is preferably obtained by cutting from a metal strip, for example by stamping. The shape of the recesses 40 for the magnets and the passages 61 for the tie rods can be recognized.

Figure 3:
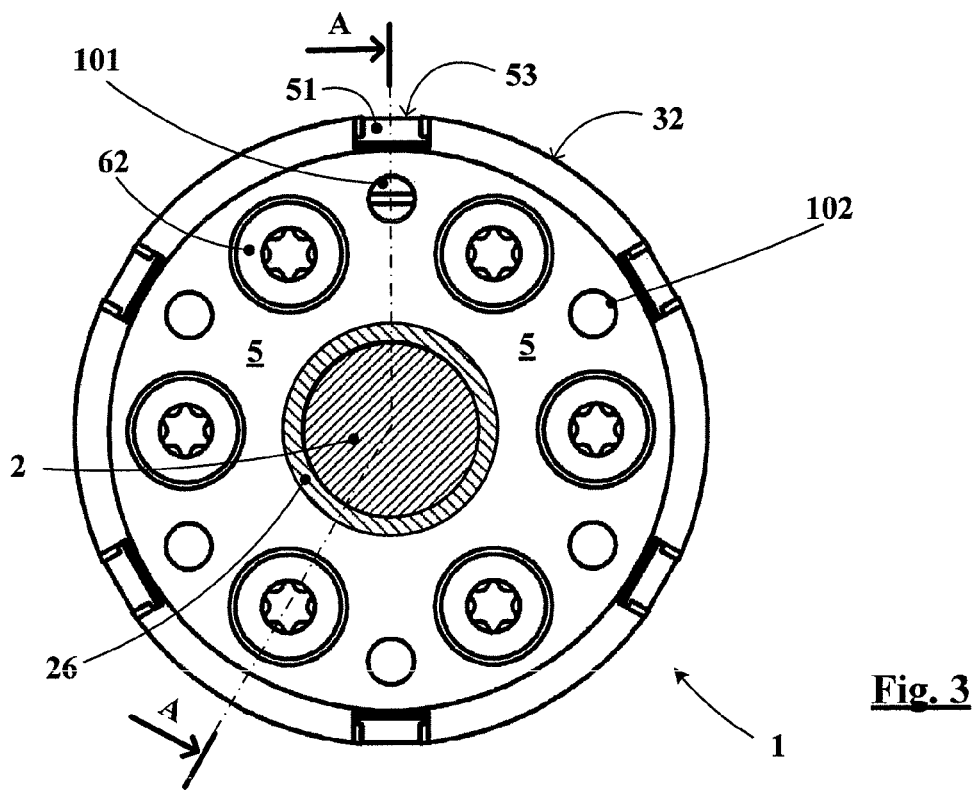
FIG. 3 is a view in cross section perpendicular to the axis of the rotor of FIG. 1 along a line C-C which can be seen in FIG. 1.

The blanks are then stacked and clamped between the lateral flanges by the tie rods. FIG. 5 shows only the stacking of the blanks. The other elements (shafts, lateral and intermediate flanges, tie rods) are omitted to make it easier to read the drawing. The reader is invited to refer to FIGS. 1 to 3 in which these elements can be seen.

According to the invention, the stack of blanks is aligned via the outer lugs 36 formed on at least two of the temporary bridges 35, preferably on diametrically opposite bridges as represented here. Guides including a suitable groove receive these lugs and hold the blanks aligned with one another before they are attached together by the tie rods. An excellent alignment of the metal sheets in the stack can thus be guaranteed. The great alignment accuracy in turn makes it possible to reduce the air gap and therefore improve the efficiency of the electric machine.

Once the stack is immobilized by the tie rods, the temporary bridges 35 can be eliminated, for example by milling as schematically represented in FIG. 6. The elimination of the bridges frees up the radial access to the recesses 40 and eliminates the outer lugs 36 at the same time.

It is understood that this essential characteristic of the method according to the invention makes it possible to speed up the manufacture of the rotors by reducing the number of pieces and by greatly simplifying the manipulation of the metal sheets.

In a particular embodiment, the operation consisting in eliminating the temporary bridges at the same time makes it possible to produce the grooves 31 intended to receive the wedges 51 holding the magnets. This is represented by the example of FIG. 6 in which a tapered milling cutter is used simultaneously to machine the two grooves 31 and to eliminate the bridges.

In FIG. 7, the rotor obtained in this way can be seen in cross section. Around the grooved shaft 2, there can be clearly seen the magnets 4 held in their recesses 40 by the wedges 51, as well as the tie rods 6 which compress the stack of the metal sheets 3. The section of the wedges is here substantially trapezoidal (in the form of a dovetail) but in fact any other section can be adopted on the sole condition that it can cooperate with the grooves 31 of the pole pieces to seal the recesses and obtain a radial blocking of the magnets.

FIG. 8 illustrates another exemplary production method according to the invention. This embodiment makes it possible to accommodate wedges 51 of "T" shaped shouldered section as can be seen in FIG. 2. The corresponding grooves 31 are precut in the blank 33 and the operation whose function is to eliminate the bridges 35 then has no function other than to free up the radial access to the recesses 40 of the magnets. This operation can be performed by chopping the two ends of the bridges as schematically represented here or else by radial axis milling (according to the diagram of FIG. 6, but by using a cylindrical milling cutter).

Depending on the shape of the recesses, of the grooves and of the wedges, it will be understood that different methods and tools can be chosen to perform this operation. For example, the profile of the grooves of FIG. 6 cannot be obtained by chopping or milling along its tangential axis as described in FIG. 8. On the other hand, the profile of the grooves of FIG. 8 could be obtained by milling along the radial axis providing that a specific milling cutter is used, "T" shaped for example according to the diagram of FIG. 9.

Figure 10:
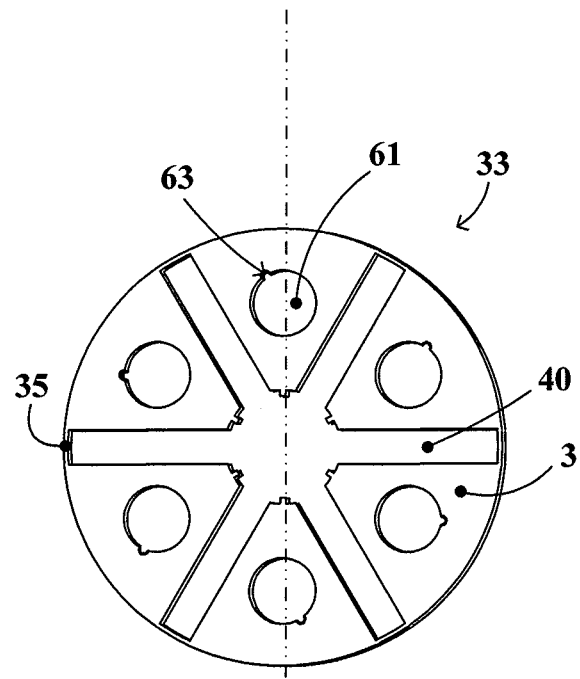
FIGS. 10 and 11 illustrate an embodiment of the method of the invention in which the blank stacking operation is combined with a turning, over of the blanks.
Figure 11:
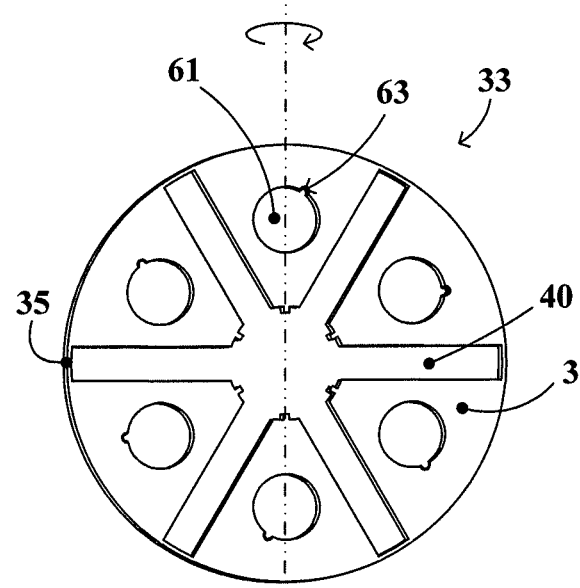

FIGS. 10 and 11 illustrate a preferred characteristic of the method for manufacturing the rotor according to which the blanks are stacked head-to-tail and, for this, preferably include a marking 63 making it possible to identify the two faces of the blank. The marking 63 may be, as here, a particular cut of the passage 61 arranged so that it can be clearly seen if one face or the other is being tackled. In practice, if FIGS. 10 and 11, each of which shows a different face of the same blank, are compared, it can be seen that the cut 63 appears offset to one side or the other of the passage 61.

Stacking the blanks by systematically turning over one blank in every two makes it possible to offset any thickness variation from one side to the other of the blank. The source of this variation may result from a variation in the thickness of the metal strip or from the method used to cut the blanks, or from any other cause.

In order to avoid introducing any imbalance, the marking is preferably present on each of the six passages in the blank. Furthermore, the multiplication of the markings further simplifies the identification of the faces.

Figure 14:
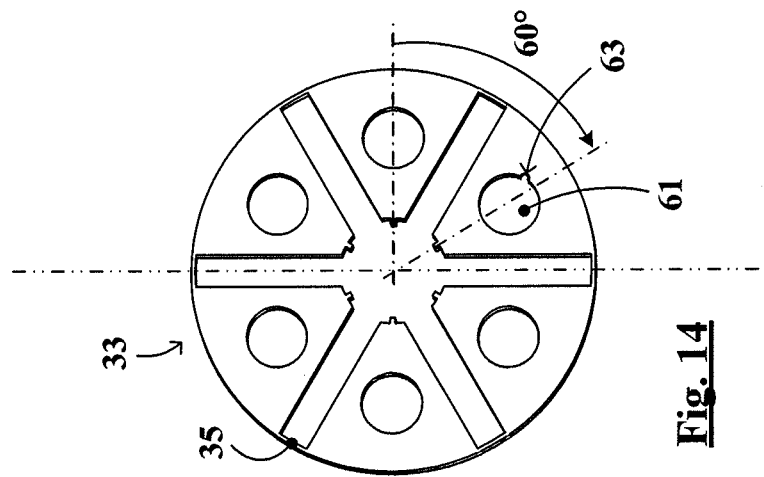
FIGS. 12 to 14 illustrate another embodiment of the method of the invention in which the blank stacking operation is combined with a rotation between each blank.
Figure 13:
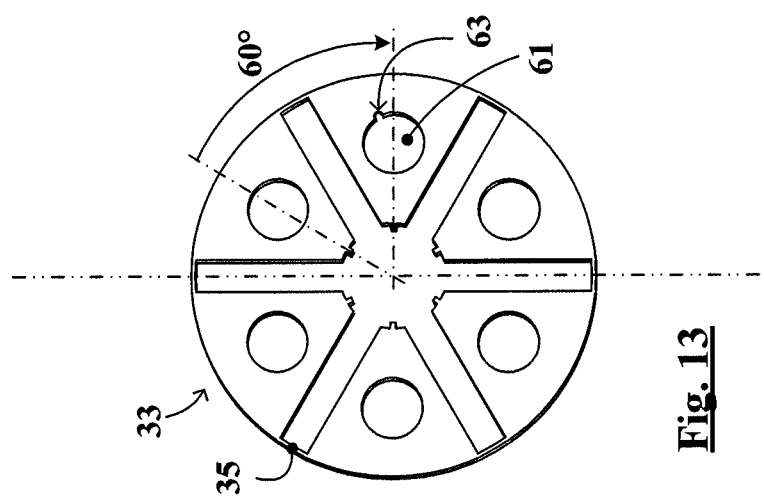
Figure 12:
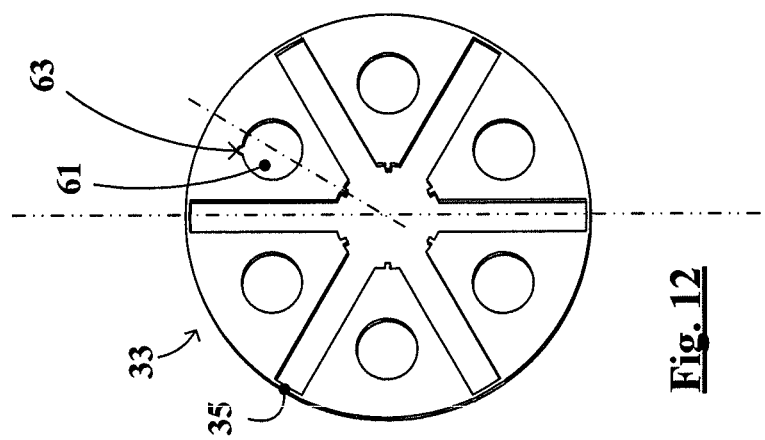

FIGS. 12 to 14 illustrate an alternative to the head-to-tail stacking described in FIGS. 10 and 11. The blanks 33 are this time stacked by indexing each blank by a certain angle and, for this, preferably include a single marking 63 used to identify one tie-rod passage out of the six passages in the blank. By comparing FIGS. 12, 13 and 14, it can be seen that, from one figure to the next, the blank is indexed by a sixth of a revolution (60°) to the right. The indexing angle may in fact correspond to any multiple of 60°, for example 120°, 180°, 240°, etc. A 180° indexing may be entirely satisfactory to offset any thickness variations and at the same time allow for a relatively simple method in which one metal sheet in every two is indexed according to a single angle (180°).

The indexing method is preferred to the turning-over method described above, in particular when the method used to cut the blanks has a tendency to deform the edges of the pieces. Such is the case with stamping, which tends to form burrs which then prevent the metal sheets from stacking cleanly in the case of turning-over.

Naturally, an indexing and a turning-over can be carried out at the same time, or the two movements can be alternated. Similarly, a hexa-polar rotor has been represented and an indexing of 60°, in other words the angle separating two adjacent poles. An equivalent effect is obtained with an indexing of α=+/−360°/n, "n" being the number of poles of the rotor.

The markings 63 which can be seen in the figures are easily obtained when cutting the blanks. Alternatively, these markings can be made on the temporary bridges 35, including on the outer lugs 36. They are then bound to disappear when the bridges are eliminated, which at the same time eliminates any imbalance brought about by the markings. Naturally, other marking means can be used for the same purpose to identify a face or an orientation of the blank with a view to its turning-over or its indexing on stacking. The markings are above all useful when the metal sheets are manipulated manually. In the case of automated manipulations, they can usually be dispensed with.

The method according to the invention makes it possible to obtain rotors with a very good geometrical quality in enhanced productivity conditions.

However, once the rotor is finally assembled, counterweights 100 can be fixed to the flanges in order to further perfect the static and dynamic balancing of the rotor (see FIG. 2).

The balancing counterweights here take the form of worm screws 101 that are positioned in tapped holes 102 formed in the flanges. Each flange thus includes six tapped holes 102 in addition to the six passages 61 for the six tie rods 6.

It will be understood that, by adjusting the position, the length and/or the material chosen for each balancing counterweight, the balance of the rotor can be finely adjusted.

The method therefore preferably also comprises subsequent steps consisting, in succession, in:
rotating the assembled rotor on a balancing machine;
determining positions and weights of counterweights needed for the balancing;
fixing the necessary counterweights to the flanges.

Alternatively, the counterweights may also be fixed to the tie rods.

Preferably, the assembly/balancing method also comprises a subsequent step consisting in checking the correct balancing of the rotor on the same machine.

Also preferably, the assembly/balancing method also comprises a preliminary step consisting in rotating the rotor with the tightness of the tie rods reduced and then carrying out the final tightening of the tie rods. In this way, it is possible to ensure that all the constituent elements of the rotor (in particular the ferro-magnetic metal sheets and the permanent magnets) are correctly centrifuged before their final immobilization. The centrifugation can be done at a rotation speed of the order of 50% of the planned maximum service speed.

Alternatively, the centrifugation can be done after the final tightening by this time applying a rotation speed at least equal to the maximum planned service speed (for example of the order of 120% of the maximum speed).

As has been seen, the figures represent a hexa-polar rotor, that is to say a rotor with 3 pairs of poles, but those skilled in the art will be able to transpose the technical teachings of this application to rotors that have, for example, 2, 4 or 5 pairs of poles instead of 3.

The invention claimed is:

1. A method for manufacturing an inner rotor for a rotary electric machine, the rotor comprising a plurality of pole pieces surrounding a shaft, each pole piece being made from a stack of metal sheets made of magnetic material, the pole pieces delimiting recesses between them for permanent magnets, said method comprising, in succession, the steps of:
cutting blanks, each grouping together n metal sheets, "n" being the number of poles of the rotor, the n metal sheets of a blank being held together by temporary bridges straddling the recesses, at least two bridges each including an outer lug;
stacking the blanks while keeping said blanks aligned via outer lugs;
immobilizing the stack of blanks;
eliminating all the temporary bridges in order to free up radial access to the recesses for the permanent magnets; and
inserting the permanent magnets radially into the recesses.

2. The method according to claim 1, wherein the stack of blanks is immobilized between lateral flanges via tie rods, the lateral flanges and the tie rods then forming an integral part of the inner rotor.

3. The method according to claim 1, wherein the temporary bridges are eliminated by machining.

4. The method according to claim 3, wherein the machining also has the effect of producing longitudinal grooves in the walls of the recesses in proximity to the outer edge of the pole pieces.

5. The method according to claim 1, wherein the cutting of the blanks also has the effect of defining longitudinal grooves in the walls of the recesses in proximity to the outer edge of the pole pieces.

6. The method according to claim 5, further comprising a subsequent step of:
   placing wedges for radially securing the permanent magnets in the longitudinal grooves.

7. The method according to claim 1, wherein the blanks are obtained by cutting a metal strip.

8. The method according to claim 1, wherein one blank in every two is turned over after cutting and before stacking.

9. The method according to claim 1, wherein each blank is indexed by an angle $\alpha$ relative to the preceding blank during the stacking, $\alpha$ being a multiple of $360°/n$.

10. The method according to claim 1, wherein the blanks are obtained by stamping.

* * * * *